US010392991B2

(12) United States Patent
Geveci et al.

(10) Patent No.: US 10,392,991 B2
(45) Date of Patent: Aug. 27, 2019

(54) AMMONIA SENSOR CONTROL, WITH $NO_x$ FEEDBACK, OF AN SCR AFTERTREATMENT SYSTEM

(71) Applicant: Cummins Inc., Columbus, IN (US)

(72) Inventors: Mert Geveci, Delmar, NY (US); Andrew W. Osburn, Nashville, IN (US)

(73) Assignee: Cummins Inc., Columbus, IN (US)

( * ) Notice: Subject to any disclaimer, the term of this patent is extended or adjusted under 35 U.S.C. 154(b) by 316 days.

(21) Appl. No.: 15/298,992

(22) Filed: Oct. 20, 2016

(65) Prior Publication Data

US 2017/0037758 A1 Feb. 9, 2017

Related U.S. Application Data

(63) Continuation of application No. 13/097,947, filed on Apr. 29, 2011, now Pat. No. 9,476,338.

(Continued)

(51) Int. Cl.
*F01N 3/20* (2006.01)
*F01N 9/00* (2006.01)
(Continued)

(52) U.S. Cl.
CPC ............... *F01N 3/208* (2013.01); *F01N 9/00* (2013.01); *F01N 11/007* (2013.01);
(Continued)

(58) Field of Classification Search
CPC .. F01N 3/028; F01N 11/007; F01N 2560/021; F01N 2560/026; F01N 2610/02; F01N 2610/146
See application file for complete search history.

(56) References Cited

U.S. PATENT DOCUMENTS 5,555,725 A  9/1996 Shimasaki et al.
5,645,745 A  7/1997 Hartwick et al.
(Continued)

FOREIGN PATENT DOCUMENTS

JP  2017025830 A  *  2/2017
WO  2007084690  7/2007
(Continued)

OTHER PUBLICATIONS

International Search Report and Written Opinion, PCT/US2011/03498, Cummins Inc., dated Jul. 15, 2011, 7 pgs.

*Primary Examiner* — Patrick D Maines
(74) *Attorney, Agent, or Firm* — Taft, Stettinius & Hollister LLP

(57) ABSTRACT

An exemplary method includes determining an $NH_3$ reference target in an exhaust conduit between a first SCR catalyst and a second SCR catalyst. The method includes determining a present amount of $NH_3$ in the exhaust conduit between the first SCR catalyst and the second SCR catalyst, and determining an $NH_3$ error term in response to the $NH_3$ reference target and the present amount of $NH_3$. The method further includes determining an amount of $NO_x$ downstream of the second SCR catalyst, and adjusting one of the $NH_3$ reference target and a reductant doser command in response to the amount of $NO_x$ downstream of the second SCR catalyst. The method further includes providing a reductant doser command in response to the $NH_3$ error term.

19 Claims, 3 Drawing Sheets

Related U.S. Application Data

(60) Provisional application No. 61/330,605, filed on May 3, 2010.

(51) Int. Cl.
*F01N 13/00* (2010.01)
*F01N 11/00* (2006.01)

(52) U.S. Cl.
CPC .... *F01N 13/0093* (2014.06); *F01N 2560/021* (2013.01); *F01N 2560/026* (2013.01); *F01N 2610/02* (2013.01); *F01N 2610/146* (2013.01); *F01N 2900/0402* (2013.01); *F01N 2900/0408* (2013.01); *F01N 2900/1402* (2013.01); *F01N 2900/1602* (2013.01); *F01N 2900/1616* (2013.01); *F01N 2900/1621* (2013.01); *F01N 2900/1622* (2013.01); *F01N 2900/1812* (2013.01); *Y02T 10/24* (2013.01); *Y02T 10/47* (2013.01)

(56) References Cited

U.S. PATENT DOCUMENTS

| | | | |
|---|---|---|---|
| 5,746,053 A | 5/1998 | Hibino | |
| 6,069,013 A | 5/2000 | Plog et al. | |
| 6,314,722 B1 | 11/2001 | Matros et al. | |
| 6,347,544 B1 | 2/2002 | Hada et al. | |
| 6,415,602 B1 | 7/2002 | Patchett et al. | |
| 6,662,553 B2 | 12/2003 | Patchett et al. | |
| 6,742,326 B2 | 6/2004 | Xu et al. | |
| 6,755,014 B2 | 6/2004 | Kawai et al. | |
| 6,904,751 B2 | 6/2005 | Makki et al. | |
| 6,996,975 B2 | 2/2006 | Radhamohan et al. | |
| 7,069,770 B2 | 7/2006 | Chen et al. | |
| 7,093,427 B2 | 8/2006 | Van Nieuwstadt et al. | |
| 7,150,145 B2 | 12/2006 | Patchett et al. | |
| 7,178,328 B2 | 2/2007 | Solbrig | |
| 7,204,081 B2 | 4/2007 | Yasui et al. | |
| 7,213,395 B2 | 5/2007 | Hu et al. | |
| 7,426,825 B2 | 9/2008 | Viola et al. | |
| 7,610,759 B2 | 11/2009 | Yoshida et al. | |
| 7,613,561 B1 | 11/2009 | Stewart et al. | |
| 7,810,313 B2 | 10/2010 | Stewart et al. | |
| 8,112,986 B2 | 2/2012 | Kurtz | |
| 8,176,730 B2 | 5/2012 | Shimomura et al. | |
| 8,201,394 B2 | 6/2012 | Chi et al. | |
| 8,281,578 B2 | 10/2012 | Upadhyay et al. | |
| 2002/0148220 A1 | 10/2002 | Patchett et al. | |
| 2003/0051468 A1 | 3/2003 | Van Nieuwstadt et al. | |
| 2003/0061861 A1 | 4/2003 | Irion et al. | |
| 2004/0083721 A1 | 5/2004 | Ketcher et al. | |
| 2005/0127920 A1 | 6/2005 | Mowery et al. | |
| 2005/0284134 A1 | 12/2005 | Radhamohan et al. | |
| 2007/0044456 A1 | 3/2007 | Upadhyay et al. | |
| 2007/0080074 A1 | 4/2007 | Wang et al. | |
| 2007/0122317 A1 | 5/2007 | Driscoll et al. | |
| 2007/0144151 A1* | 6/2007 | Lueders | F01N 3/2066 60/286 |
| 2008/0022658 A1 | 1/2008 | Viola et al. | |
| 2008/0250774 A1 | 10/2008 | Solbrig | |
| 2009/0031710 A1 | 2/2009 | Wei et al. | |
| 2009/0044526 A1 | 2/2009 | Carroll, III et al. | |
| 2009/0272105 A1 | 11/2009 | Chi et al. | |
| 2009/0293459 A1 | 12/2009 | Shimomura et al. | |
| 2009/0301067 A1 | 12/2009 | Dingle et al. | |
| 2010/0000202 A1 | 1/2010 | Fisher et al. | |
| 2010/0024389 A1 | 2/2010 | Gady et al. | |
| 2010/0024390 A1 | 2/2010 | Wills et al. | |
| 2010/0024397 A1 | 2/2010 | Chi et al. | |
| 2010/0043402 A1 | 2/2010 | Perry et al. | |
| 2010/0068147 A1 | 3/2010 | Hibberd et al. | |
| 2010/0101215 A1 | 4/2010 | Wu | |
| 2010/0122520 A1 | 5/2010 | Han | |
| 2010/0242440 A1 | 9/2010 | Garimella et al. | |
| 2011/0023463 A1 | 2/2011 | Dodson et al. | |
| 2011/0041480 A1* | 2/2011 | Yasui | F01N 3/208 60/286 |
| 2012/0102927 A1* | 5/2012 | Hirota | F01N 3/208 60/287 |
| 2017/0306819 A1* | 10/2017 | Alfieri | F01N 3/208 |

FOREIGN PATENT DOCUMENTS

| | | |
|---|---|---|
| WO | 2008009940 | 1/2008 |
| WO | 2009036780 | 3/2009 |
| WO | 2009089936 | 7/2009 |

\* cited by examiner

AMMONIA SENSOR CONTROL, WITH NO$_x$ FEEDBACK, OF AN SCR AFTERTREATMENT SYSTEM

RELATED APPLICATIONS

This application is related to, and claims the benefit of, U.S. Provisional Patent Application No. 61/330,605 entitled AMMONIA SENSOR CONTROL OF AN SCR AFTERTREATMENT SYSTEM and filed May 3, 2010, and U.S. patent application Ser. No. 13/051,693 entitled AMMONIA SENSOR CONTROL OF AN SCR AFTERTREATMENT SYSTEM and filed Mar. 18, 2011, both of which are incorporated herein by reference for all purposes.

BACKGROUND

Control of SCR catalysts is of increasing interest to meet modern internal combustion engine emissions standards. Feedforward controls are desirable to maximize fuel economy, improve system responsiveness, and reduce undesirable emissions. However, feedforward control systems are not capable of responding to disturbances that are not measured or modeled in advance. Accordingly, further technological developments in this area are desirable.

SUMMARY

One embodiment is a unique method for controlling an SCR system with a NO$_x$ sensor feedback component. Further embodiments, forms, objects, features, advantages, aspects, and benefits shall become apparent from the following description and drawings.

DESCRIPTION OF THE ILLUSTRATIVE EMBODIMENTS

Figure 1:
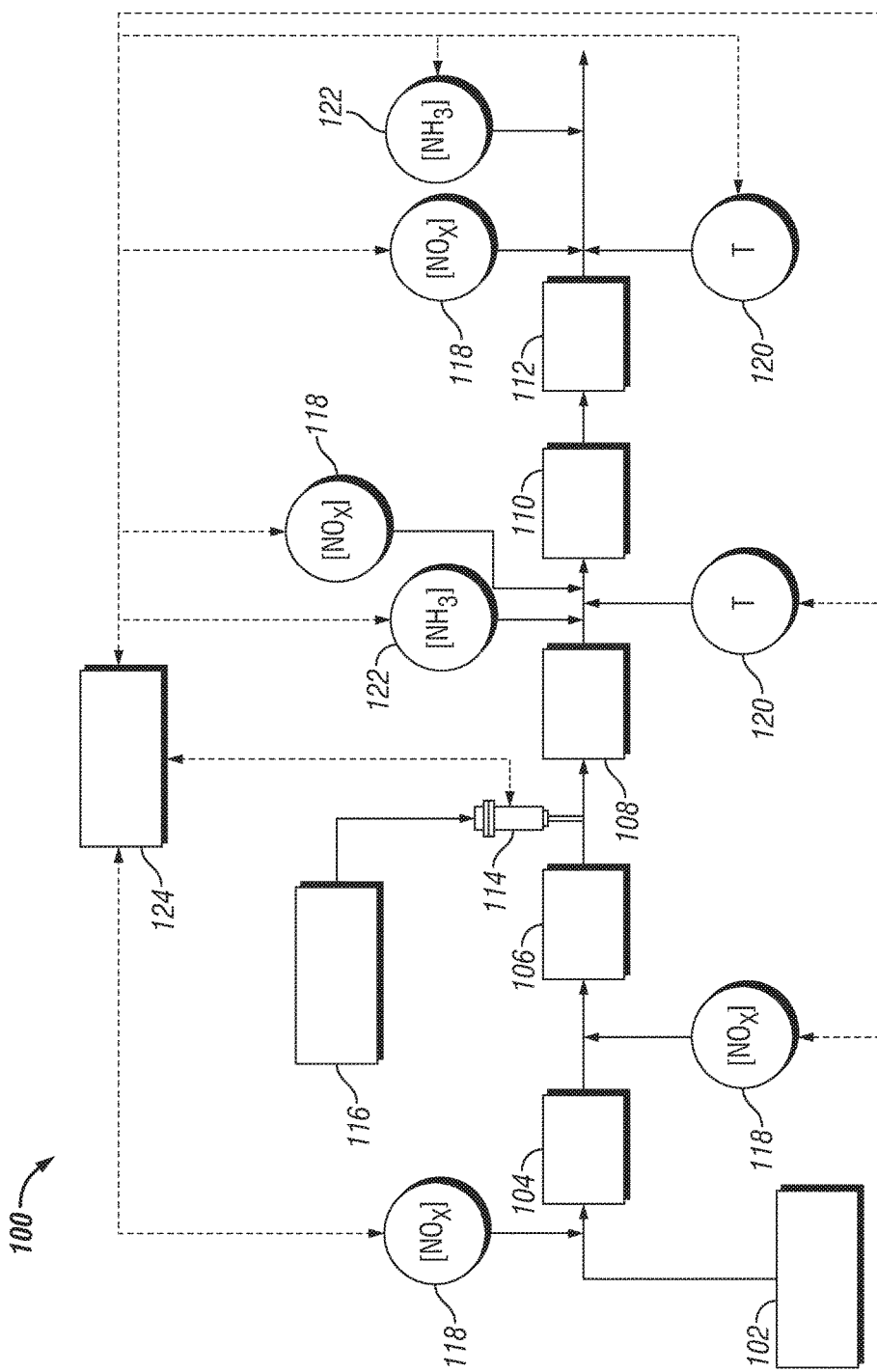
FIG. 1 is an exemplary system for control of an SCR aftertreatment system.

For the purposes of promoting an understanding of the principles of the invention, reference will now be made to the embodiments illustrated in the drawings and specific language will be used to describe the same. It will nevertheless be understood that no limitation of the scope of the invention is thereby intended, any alterations and further modifications in the illustrated embodiments, and any further applications of the principles of the invention as illustrated therein as would normally occur to one skilled in the art to which the invention relates are contemplated herein.

FIG. 1 is an exemplary system 100 for control of an SCR aftertreatment system. The system 100 includes an internal combustion engine 102 and an exhaust conduit fluidly coupled to the internal combustion engine. The system 100 includes a first selective catalytic reduction (SCR) catalyst 108 fluidly coupled to the exhaust conduit, and a second SCR catalyst 110 fluidly coupled to the exhaust conduit at a position downstream of the first SCR catalyst 108. The system 100 includes an ammonia sensor 122 operationally coupled to the exhaust conduit at a position between the first SCR catalyst 108 and the second SCR catalyst 110, and a reductant doser 114 operationally coupled to the exhaust conduit at a position upstream of the first SCR catalyst 108.

The system 100 further includes a controller 124 having a number of modules structured to functionally execute operations for controlling the SCR system. In certain embodiments, the controller forms a portion of a processing subsystem including one or more computing devices having memory, processing, and communication hardware. The controller may be a single device or a distributed device, and the functions of the controller may be performed by hardware or software. The controller may be in communication with any sensor, actuator, datalink, and/or network in the system.

In certain embodiments, the controller includes an NH$_3$ target module, an NH$_3$ determination module, an NH$_3$ error module, a dosing control module, an outer loop control module, a time response adjustment module, and/or a NO$_x$ trimming module. The description herein including modules emphasizes the structural independence of the aspects of the controller, and illustrates one grouping of operations and responsibilities of the controller. Other groupings that execute similar overall operations are understood within the scope of the present application. Modules may be implemented in hardware and/or software on computer readable medium, and modules may be distributed across various hardware or software components. More specific descriptions of certain embodiments of controller operations are included in the section referencing FIG. 2.

In certain further embodiments, the system 100 includes a diesel oxidation catalyst (DOC) 104 and a diesel particulate filter (DPF) 106 positioned upstream of the first SCR catalyst 108. Any of these components may be present or missing, catalyzed or not catalyzed, and may be arranged in alternate order. Further, certain components or all components may be provided in the same or separate housings. The first SCR catalyst 108 and the second SCR catalyst 110 may be positioned within the same catalyst brick, with the position of the ammonia sensor 122 defining the separation point between the first SCR catalyst 108 and the second SCR catalyst 110.

The reductant doser 114 is fluidly coupled to a reductant source such as a reductant storage tank 116. The reductant is any type of reductant utilized in an SCR aftertreatment system that results in ammonia being utilized as the final reductant—including at least ammonia (gaseous or aqueous) and urea. Certain operations described herein apply to NO$_x$ reduction generally and are not specific to SCR systems. Where the NO$_x$ reduction operations are not specific to SCR systems, hydrocarbon or other reductants may be utilized.

The system 100 may include an ammonia oxidation catalyst (AMOX) 112 downstream of the second SCR catalyst 110. In certain embodiments, the AMOX 112 may not be present, or the AMOX 112 may be commingled with the second SCR catalyst 110 (or the last SCR catalyst, where multiple SCR catalysts are present), for example with a washcoat applied toward the rear portion of the second SCR catalyst 110 that is responsive to at least partially oxidize ammonia.

The exemplary system 100 further includes various sensors. The illustrated sensors include a NO$_x$ sensor 118 positioned upstream of the first SCR catalyst 108, a second NO$_x$ sensor 118 positioned downstream of the second SCR catalyst 110, a temperature sensor 120 positioned between the first and second SCR catalysts 108, 110, and a temperature sensor 120 positioned downstream of the AMOX catalyst 112. The illustrated sensors are exemplary only, and may be re-positioned, removed, substituted, and other sensors may be present that are not illustrated in FIG. 1. Certain embodiments of the system 100 do not include a $NO_x$ sensor present upstream of the first SCR catalyst, an $NH_3$ sensor present downstream of the second SCR catalyst, or both. Further, certain sensors may instead be virtual sensors that are calculated from other parameters available to the system, or values that would be indicated by sensors may instead be supplied to a computer readable memory location, via a datalink or network communication, or otherwise be made available to the system where the sensor providing the sensed parameter is not a part of the defined system.

Figure 2:
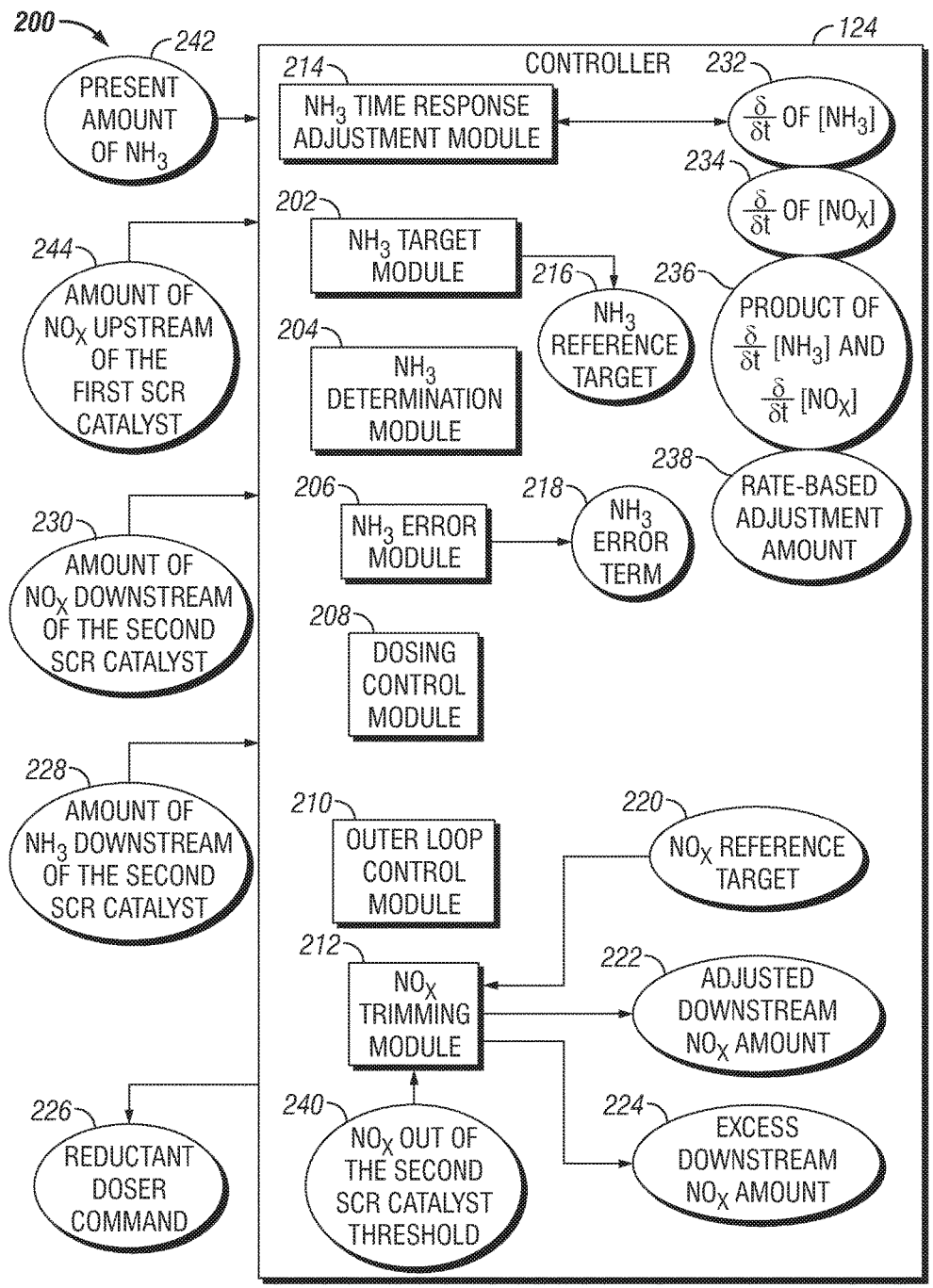
FIG. 2 is an exemplary controller for executing operations to apply a rate-based adjustment and/or a downstream NO$_x$ adjustment to a reductant doser command.

FIG. 2 is an exemplary controller 124 for executing operations to apply a rate-based adjustment and/or a downstream $NO_x$ adjustment to a reductant doser command. The controller operations of the controller in FIG. 2 are operations that adjust nominal control operations for a $NO_x$ aftertreatment system utilizing a reductant. Nominal control operations for a $NO_x$ aftertreatment system, including an SCR aftertreatment system, are understood in the art and are not described further herein. Any nominal $NO_x$ aftertreatment control operations may be utilized, including without limitation control operations described in U.S. Provisional application 61/330,605 "Ammonia sensor control of an SCR aftertreatment system," filed May 3, 2010, and U.S. patent application Ser. No. 13/051,693 "Ammonia sensor control of an SCR aftertreatment sensor," filed Mar. 18, 2011.

The controller 124 includes an ammonia ($NH_3$) target module 202 that determines an $NH_3$ reference target 216. The $NH_3$ reference target 216 is a target amount of $NH_3$ in an exhaust conduit between the first SCR catalyst and the second SCR catalyst. The $NH_3$ reference target 216, before adjustments, is a nominal control value for the controller, and/or is determined in response to the nominal control value. For example, the $NH_3$ reference target 216 may be the $NH_3$ value between the SCR catalysts that occurs in response to a targeted amount of reductant injected upstream of the first SCR catalyst as determined from an amount of $NO_x$ being emitted by the engine. In certain embodiments, the $NH_3$ reference target 216 is the feedforward $NH_3$ concentration that is desired at the position between the SCR catalysts according to a nominal control algorithm before adjustments.

The controller 124 further includes an $NH_3$ determination module 204 that determines a present amount of $NH_3$ 242 in the exhaust conduit between the first SCR catalyst and the second SCR catalyst, and an $NH_3$ error module 206 that determines an $NH_3$ error term 218 in response to the $NH_3$ reference target 216 and the present amount of $NH_3$ 242. The controller 124 further includes a dosing control module 208 that provides a reductant doser command 226 in response to the $NH_3$ error term 218. The reductant doser command 226 provided by the dosing control module 208, before any adjustments from the outer look control module 210 are applied, may be an inner loop reductant doser command 226.

The controller 124 further includes an outer loop control module 210 that determines an amount of $NO_x$ downstream of the second SCR catalyst 230, and adjusts one of the $NH_3$ reference target 216 and the reductant doser command 226 in response to the amount of $NO_x$ downstream of the second SCR catalyst 230. In certain embodiments, the outer loop control module 210 further adjusts the one of the ammonia reference target 216 and the reductant doser command 226 only when the amount of $NO_x$ downstream of the second SCR catalyst 230 exceeds a threshold value. An exemplary threshold value is a $NO_x$ reference target 220, which is a predetermined amount of $NO_x$ that is determined to be a high enough $NO_x$ level that the outer loop control module 210 should implement an adjustment and reduce the $NO_x$ output of the system. In certain embodiments, the outer loop control module 210 is a low-gain control element relative to the inner loop control, and has a control response time on the same order of magnitude as a catalyst degradation rate is expected to occur in the system. However, the outer loop control module 210 may be responsive to other system disturbances, and may include control response times that are as fast as, or faster than, the inner loop control.

The outer loop control module 210 adjusts the $NH_3$ reference target, the reductant doser command, or both. One of skill in the art will recognize that the adjustment of the NH3 reference target, the NH3 error term, or any other control parameter upstream of the reductant doser command 226 ultimately adjusts the reductant doser command 226. The selection of an appropriate parameter for adjustment is a design choice, and the adjustment of any parameter that affects the reductant doser command 226, including direct adjustment of the reductant doser command 226, is contemplated herein. For example, where the outer loop control module 210 determines that the amount of NOx downstream of the second SCR catalyst 230 is too high, and is high enough to permit adjustment (e.g. exceeds the NOx reference target 220), the outer loop control module 210 may increase the reductant doser command 226, increase the NH3 reference target 216, and/or increase the NH3 error term 218, where the increase amount and time of the increase are selected to provide the desired adjusted response of the reductant doser.

An exemplary controller 124 further includes an $NH_3$ time response adjustment module 214 that determines at least one of a rate of change of the present amount of $NH_3$ 232, and/or a rate of change of the amount of $NO_x$ downstream of the second SCR catalyst 234. The $NH_3$ time response adjustment module 214 further adjusts the one of the $NH_3$ reference target 216 and the reductant doser command 226 in response to the rate of change(s) 232, 234. A further exemplary controller 124 includes the $NH_3$ time response adjustment module 214 determining a product 236 of the rate of change of the present amount of $NH_3$ and the rate of change of the amount of $NO_x$ downstream of the second SCR catalyst, and further adjusting the one of the $NH_3$ reference target 216 and/or the reductant doser command 226 in response to the product 236.

A further exemplary controller 124 includes the $NH_3$ time response adjustment module 214 further determining a rate-based adjustment amount 238 as a function of the product 236, and further adjusting the one of the $NH_3$ reference target 216 and the reductant doser command 226 in response to the rate-based adjustment amount 238. Additionally or alternatively, the function of the product 236 that determines the rate-based adjustment amount 238 is a non-linear function. An exemplary non-linear function includes a low gain in a negative region of the product and a high gain in a positive region of the product. The term low gain and high gain implies that, for a given magnitude of the product, the value on the negative side is lower than the value on the positive side. However, the response of the rate-based adjustment amount 238 to the product 236 on each side of the product magnitude line may be linear, non-linear, a polynomial or other response function, or a selected function described from a lookup table having a desired response curve.

In a further embodiment, the $NH_3$ time response adjustment module 214 further limits the rate-based adjustment amount 238 to a proportion of an amount of $NO_x$ upstream of the first SCR catalyst 230. For example, the rate based adjustment amount 238 may be limited to an amount of reductant increase (or decrease) that is sufficient to treat 10%, 25%, 50%, or 100% of the incoming NOx amount 230. For example, if the amount of $NO_x$ upstream of the first SCR catalyst 230 is 2 grams per minute, the rate-based adjustement amount 238 may be limited to sufficient reducant to treat 0.2 g/min, 0.5 g/min, 1.0 g/min, or 2 g/min of incoming NOx. In certain embodiments, the rate-based adjustment amount 238 may be unlimited, or limited to values that are higher than sufficient reductant to treat 100% of incoming NOx.

In certain embodiments, the apparatus includes a $NO_x$ trimming module 212 that determines an adjusted downstream $NO_x$ amount 222 in response to the amount of $NO_x$ downstream of the second SCR catalyst 230 and an amount of $NH_3$ downstream of the second SCR catalyst 228. Determining the adjusted downstream $NO_x$ amount 222 includes accounting for cross-sensitivity of $NO_x$ sensors to $NH_3$, where the $NO_x$ sensor erroneously interprets a portion of the $NH_3$ present as $NO_x$. In a simple embodiment, the detected amount of $NH_3$ 228 is subtracted from the detected amount of $NO_x$ 230 to determine the adjusted downstream $NO_x$ amount 222. Where the actual cross-sensitivity level is known, the correction may be utilized using the actual cross-sensitivity level—for example if 5 units of $NH_3$ are known to erroneously indicate 4 units of $NO_x$, then the adjusted downstream $NO_x$ amount 222 may be determined by subtracting 80% of the $NH_3$ amount 228 from the $NO_x$ amount 230.

In certain embodiments, the $NO_x$ trimming module further adjusts the one of the $NH_3$ reference target 216 and the reductant doser command 226 in response to the adjusted downstream $NO_x$ amount 222. For example, where the adjusted downstream $NO_x$ amount 222 indicates that a lower amount of $NO_x$ is present than indicated by the $NO_x$ amount 230, the $NO_x$ trimming module may decrease the $NH_3$ reference target and/or the reductant doser command 226 accordingly. The decrease may be the amount of difference between the adjusted downstream $NO_x$ amount 222 and the $NO_x$ amount 230, or a fraction thereof. In further embodiments, the $NO_x$ trimming module 212 determines an excess downstream $NO_x$ amount 224 in response to the adjusted downstream $NO_x$ amount 222 and a $NO_x$ reference target 220, and further adjust the one of the $NH_3$ reference target 216 and the reductant doser command 226 in response to the excess downstream $NO_x$ amount 224. The $NO_x$ reference target 220 may be a regulated $NO_x$ amount, a planned $NO_x$ amount, or a $NO_x$ amount determined according to criteria understood in the art.

The controller further includes a dosing control module 208 that provides the reductant doser command 226 in response to the $NH_3$ error term 218. The reductant doser command 226 may be provided under any control scheme understood in the art, and/or under specific control schemes described herein. The reductant doser command 226 may include an actuator command value, a voltage or other electrical signal, and/or a datalink or network command. In certain embodiments, a reductant doser in a system including the controller 124 is responsive to the reductant doser command 226 to provide reductant to an exhaust stream at a position upstream of an SCR catalyst.

In certain embodiments, the outer loop control module 210 determines an amount of $NO_x$ downstream of the second SCR catalyst 230, and adjusts the ammonia reference target 216 and/or the reductant doser command 226 in response to the amount of $NO_x$ downstream of the second SCR catalyst 230. The outer loop control module 210 may operate on an execution cycle that is much slower than the execution cycle of the $NH_3$ target module 202. Additionally or alternatively, the outer loop control module 210 may have limited authority to make adjustments to the NH3 reference target 216 and/or the reductant doser command 226, either in magnitude and/or rate of adjustment. For example, the outer loop control module 210 may be limited to a maximum adjustment amount, or a maximum adjustment increment per selected unit of time. Further, the outer loop control module 210 may be limited to making adjustments only when a significant amount of $NO_x$ is observed downstream of the second SCR catalyst, for example only when the amount of $NO_x$ downstream of the second SCR catalyst 230 exceeds a threshold. The threshold is determined, in one embodiment, on the amount of $NO_x$ that must be present to provide an acceptable signal-to-noise ratio of the $NO_x$ reading from the $NO_x$ sensor downstream of the second SCR catalyst.

Further still, the outer loop control module 210 may filter or heavily filter the $NO_x$ output observed downstream of the second SCR catalyst 230 to reduce observed spikes or erroneous readings. Further still, the adjustment provided by the outer loop control module 210 may degrade over time back toward a non-adjusted value, or may reset under certain conditions to a non-adjusted value (e.g. when a service operation is performed to change the first and/or second SCR catalysts).

In one embodiment, the outer loop control module 210 is utilized to correct for long-term damage or degradation to the first and/or second SCR catalysts, and provides a direct feedback control element to the controller 124 that operates outside of the at least partially feedforward $NH_3$ target module 202. Yet further still, the outer loop control module 210 may suspend operations and/or provide an error value where system conditions indicate that observed $NO_x$ downstream 230 of the second SCR catalyst is actually $NH_3$—for example where increasing the reductant doser command provides corresponding increased observed $NO_x$ rather than decreased observed $NO_x$. Additionally or alternatively, the outer loop control module 210 suspends operations where system conditions otherwise indicate that significant $NH_3$ slip is expected downstream of the second SCR catalyst. The outer loop control module 210 may perform all operations from a NOx sensor reading downstream of a third or subsequent SCR catalyst where present, from downstream of all of the present SCR catalysts, but in any case downstream of at least two SCR catalysts, where at least one of the two SCR catalysts is downstream from the $NH_3$ sensor.

In certain embodiments, the time response adjustment module 214 determines a first rate of change that is a time derivative of the present amount of $NH_3$ 232 in the exhaust conduit between the first SCR catalyst and the second SCR catalyst. The dosing control module 208 provides the reductant doser command 226 further in response to the first rate of change 232. The utilization of the first rate of change 232 in determining the reductant doser command 226 improves the responsiveness of the controller 124 to transient events. In a further embodiment, the time response adjustment module 214 further determines a second rate of change 234 that is a time derivative of an amount of $NO_x$ downstream of the second SCR catalyst, and the dosing control module 208 further provides the reductant doser command 226 in response to the second rate of change 234.

The time response adjustment module 214 may determine a product 236 of the first rate of change 232 and the second rate of change 234, and the dosing control module 208 provides the reductant doser command 226 further in response to the product 236. In a still further embodiment, the time response adjustment module 214 determines a rate-based adjustment amount 238 as a function of the product 236, and the dosing control module 208 further provides the reductant doser command 226 in response to the rate-based adjustment amount 238. The function of the product may be a nonlinear response. In certain embodiments, the function of the product provides a shallow (or low gain) response to a negative product 236, and a steep (or high gain) response to a positive product 236. A negative product 234 is indicative of a falling $NH_3$ amount or a falling $NO_x$ amount. A positive product is indicative of both the $NH_3$ amount and the $NO_x$ amount rising or falling together. Any selected response may be captured within the function of the product, and may be stored as a polynomial or other mathematical function, as a lookup table, or by other function storing method understood in the art. The time response adjustment module 214 may further limit the rate-based adjustment amount 238 to a proportion of an amount of $NO_x$ upstream of the first SCR catalyst.

In certain embodiments, a $NO_x$ trimming module 212 further determines an adjusted downstream $NO_x$ amount 222 in response to an amount of $NH_3$ downstream 228 of the second SCR catalyst and an amount of $NO_x$ downstream 230 of the second SCR catalyst. The adjusted downstream $NO_x$ amount 222 may be limited to a proportion of an amount of $NO_x$ upstream 244 of the first SCR catalyst, and/or an adjustment of the reductant doser command 226 may be limited to a proportion of the amount of $NO_x$ upstream 244 of the first SCR catalyst. For example, the NOx trimming module 212 may cap the adjusted downstream $NO_x$ adjustment amount 222 to the amount of $NO_x$ upstream 244 of the first SCR catalyst (i.e. the proportion=100%), to half the the amount of $NO_x$ upstream 244 of the first SCR catalyst, one-quarter, one-tenth, or less.

In certain embodiments, if the amount of $NO_x$ downstream 230 of the second SCR catalyst exceeds a threshold with the full available downstream $NO_x$ adjustment amount applied, a fault or other failure indicator may be enabled. In certain embodiments, a fault or failure may be indicated if the adjusted downstream $NO_x$ amount 222 exceeds a threshold value, even if a required downstream $NO_x$ can be acceptably achieved or the adjustment amount from the adjusted downstream $NO_x$ amount 222 is not saturated. The rate-based adjustment amount 238 may be capped in a similar manner to the adjusted downstream $NO_x$ amount 222. The adjustments may likewise be capped together in a single operation, and/or a final output of all of the adjustments combined may be capped.

In certain embodiments, the dosing control module 208 further provides the reductant doser command 226 in response to the first rate of change 232, the second rate of change 234, the adjusted downstream $NO_x$ amount 222, and/or the rate-based adjustment amount 238 by adjusting one of the reductant doser command 226 and the ammonia reference target 216. For example, the dosing control module 208 may adjust the reductant doser command 226 to provide an adjusted amount of reductant according to the adjustments from the rate-based adjustment amount 238 and the adjusted downstream $NO_x$ amount 222. In another example, the dosing control module 208 may modify the ammonia reference target 216, and provide the reductant doser command 226 consistent with the adjusted ammonia reference target 216. Any other adjustment mechanism understood in the art that results in an adjusted reductant doser command is contemplated herein.

Figure 3:
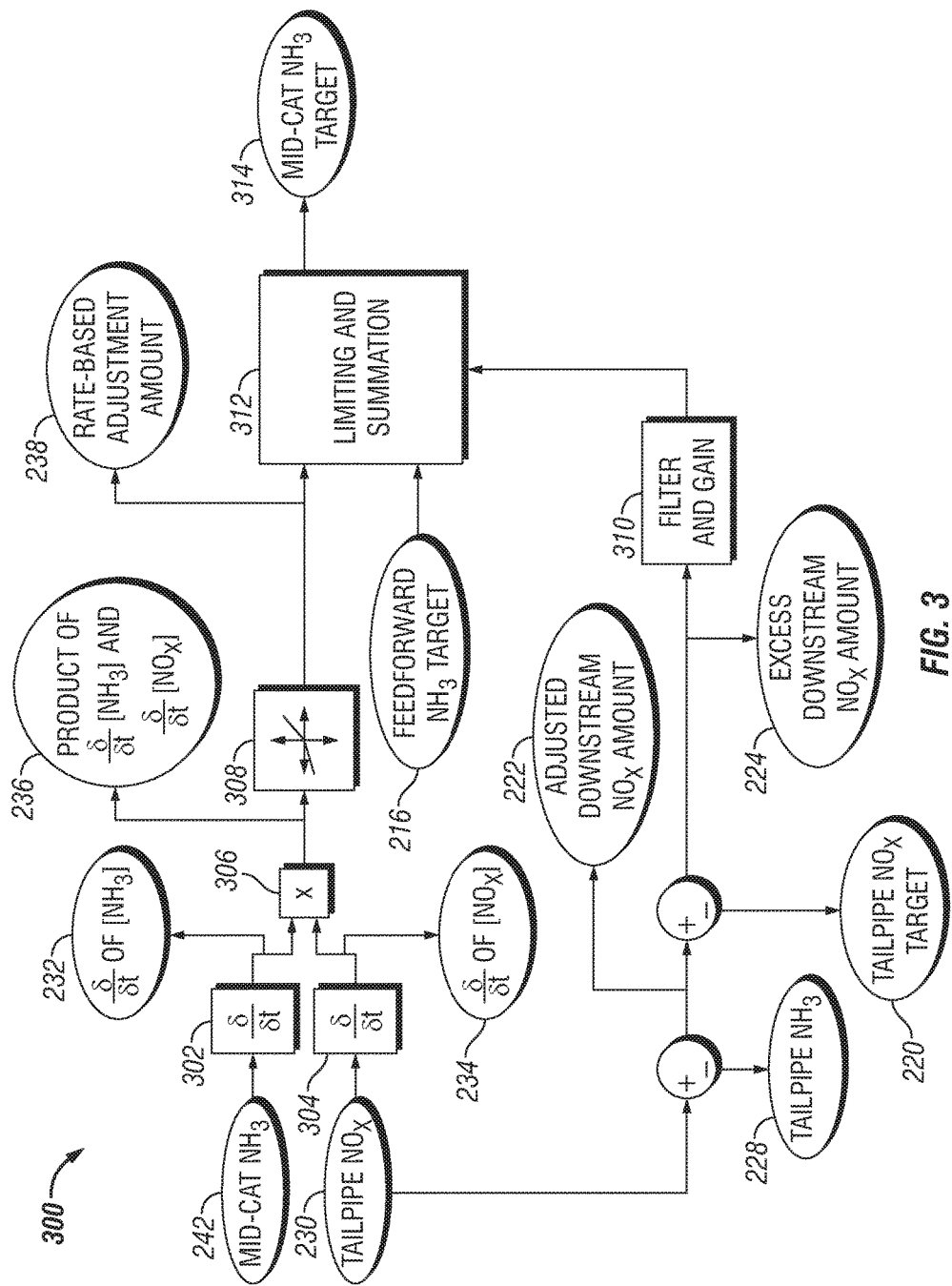
FIG. 3 is a schematic diagram of a control operation for applying a rate-based adjustment and a downstream NO$_x$ adjustment to an ammonia reference target.

Referencing FIG. 3, a schematic control diagram 300 is shown illustrating certain operations of an exemplary time response adjustment module. The time response adjustment module receives a mid-catalyst $NH_3$ amount 242, and determines a time derivative 302 of the mid-catalyst $NH_3$ amount 242. The time derivative 302 may be continuous, discrete, or any other type of mathematical description of a rate of change with time. The time derivative 302 may further be filtered, averaged, or receive other processing to reduce noise spikes. The time response adjustment module similarly determines a time derivative 304 of a $NO_x$ amount downstream 230 of the second SCR catalyst.

The time response adjustment module determines a product 236 of the time derivatives (the first rate of change and the second rate of change) at operation 306, and determines a rate-based adjustment amount 238 as a function of the product. In the example, a nonlinear lookup table 308 provides an adjustment value as a function of the product. The nonlinear lookup table 308 provides a low-gain output on the negative product 236 side, and a high-gain output on the positive product 236 side, although any relationship of a rate-based adjustment amount 238 as a function of the product 236 is contemplated herein.

The time response adjustment module further determines an $NH_3$ amount downstream 230 of the second SCR catalyst, and determines an adjusted downstream $NO_x$ amount 222 by subtracting the amount of $NH_3$ downstream 228 from the observed $NO_x$ amount. It is noted in FIG. 3 that the observed $NO_x$ amount 230, rather than the adjusted downstream $NO_x$ amount 222, is used for the second rate of change 304, but either value may be utilized. The target amount of $NO_x$ downstream of the second SCR catalyst ($NO_x$ reference target 220 or tailpipe $NO_x$ target 220) is subtracted from the adjusted downstream $NO_x$ amount 222, providing a value that is consistent with an excess downstream $NO_x$ amount 224.

The tailpipe $NO_x$ target 220 may be determined according to the required emissions for the application, from current operating conditions, and/or according to a predetermined value selected by the control designer. The excess downstream $NO_x$ amount 224 is filtered and a gain applied in operation 310. The gain may be unity, a stoichiometric fraction of reductant to $NO_x$, or a selected percentage of the stoichiometric fraction such that the system is responsive but does not try to compensate for the entire error through the downstream $NO_x$ feedback mechanism. The filtering of the $NO_x$ error downstream may have a long time constant where the downstream $NO_x$ feedback mechanism is correcting for long-term catalyst degradation. The long time constant may be an hour, a day, a week, or longer. However, a time constant of around a minute or even faster will generally not introduce noise into the operations of the time response adjustment module. Further, the downstream $NO_x$ feedback mechanism may be utilized as part of the general $NO_x$ control, not just for degradation control (e.g. where a feed-forward ammonia reference target based on models of the engine out $NO_x$ is not sufficient in a sensitive application, or where an upstream $NO_x$ sensor is in a fault condition or presently unavailable), and therefore an appropriate time constant will be understood to one of skill in the art based on the responsibility of the downstream $NO_x$ feedback mechanism.

In the example, the rate-based adjustment amount 238, the downstream $NO_x$ adjustment amount from the operation 310, and the feedforward $NH_3$ reference target 216 are combined to generate an mid-catalyst $NH_3$ reference target 314 for the amount of $NH_3$ between the first SCR catalyst and the second SCR catalyst. The total adjustment, or the individual adjustments, may be capped and the cap may be a proportion of the inlet $NO_x$ amount 244 to the first SCR catalyst. The adjustments may be added together, averaged, or a greater of the two adjustments may be applied.

The descriptions which follow provide illustrative embodiments of performing procedures for controlling an SCR aftertreatment system. Operations illustrated are understood to be exemplary only, and operations may be combined or divided, and added or removed, as well as re-ordered in whole or part, unless stated explicitly to the contrary herein. Certain operations illustrated may be implemented by a computer executing a computer program product on a computer readable medium, where the computer program product comprises instructions causing the computer to execute one or more of the operations, or to issue commands to other devices to execute one or more of the operations.

An exemplary procedure includes an operation to determine an ammonia ($NH_3$) reference target that is a target amount of $NH_3$ in an exhaust conduit between a first selective catalytic reduction (SCR) catalyst and a second SCR catalyst. The procedure further includes an operation to determine a present amount of $NH_3$ in the exhaust conduit between the first SCR catalyst and the second SCR catalyst, and an operation to determine an $NH_3$ error term in response to the $NH_3$ reference target and the present amount of $NH_3$. The procedure further includes an operation to determine an amount of $NO_x$ downstream of the second SCR catalyst, and an operation to adjust one of the $NH_3$ reference target and a reductant doser command in response to the amount of $NO_x$ downstream of the second SCR catalyst. The method further includes an operation to provide providing the reductant doser command in response to the $NH_3$ error term.

In certain embodiments, the procedure further includes an operation to determine a rate of change of the present amount of $NH_3$, and further to adjust the one of the $NH_3$ reference target and the reductant doser command in response to the rate of change. In a further embodiment, the procedure includes an operation to determine a rate of change of the amount of $NO_x$ downstream of the second SCR catalyst, and further to adjust the one of the $NH_3$ reference target and the reductant doser command in response to the rate of change of the amount of $NO_x$ downstream of the second SCR catalyst.

An exemplary procedure further includes an operation to determine a rate of change of the amount of $NO_x$ downstream of the second SCR catalyst, and an operation to adjust the one of the $NH_3$ reference target and the reductant doser command in response to the rate of change of the amount of $NO_x$ downstream of the second SCR catalyst. A further exemplary procedure includes an operation to determine a product of the rate of change of the present amount of $NH_3$ and the rate of change of the amount of $NO_x$ downstream of the second SCR catalyst, and to further adjust the one of the $NH_3$ reference target and the reductant doser command in response to the product.

A still further exemplary procedure includes an operation to determine a rate-based adjustment amount as a function of the product, and further to adjust the one of the $NH_3$ reference target and the reductant doser command in response to the rate-based adjustment amount. A still further embodiment of the procedure includes an operation to limit the rate-based adjustment amount to a proportion of an amount of $NO_x$ upstream of the first SCR catalyst. An exemplary procedure further includes an operation to limit the proportion to an amount less than one-half of the amount of $NO_x$ upstream of the first SCR catalyst.

Another exemplary procedure further includes an operation to determine an amount of $NH_3$ downstream of the second SCR catalyst, and an operation to adjust the one of the $NH_3$ reference target and the reductant doser command in response to the amount of $NH_3$ downstream of the second SCR catalyst. A further exemplary procedure includes an operation to determine an adjusted downstream $NO_x$ amount by subtracting the amount of $NH_3$ downstream of the second SCR catalyst from the amount of $NO_x$ downstream of the second SCR catalyst, and further to adjust the one of the $NH_3$ reference target and the reductant doser command in response to the adjusted downstream $NO_x$ amount. A still further exemplary procedure includes an operation to determine an excess downstream $NO_x$ amount in response to the adjusted downstream $NO_x$ amount and a $NO_x$ reference target, and further to adjust the one of the $NH_3$ reference target and the reductant doser command in response to the excess downstream $NO_x$ amount.

Another exemplary procedure is described following. The exemplary procedure includes an operation to interpret an $NH_3$ reference target that is a target amount of $NH_3$ present at a mid-bed position between two selective catalytic reduction (SCR) catalysts, an operation to interpret an amount of $NO_x$ downstream of the SCR catalysts, and an operation to adjust the $NH_3$ reference target in response to the amount of $NO_x$ downstream. The procedure further includes an operation to inject an amount of urea upstream of the SCR catalysts in response to the adjusted $NH_3$ reference target. In certain further embodiments, the procedure includes an operation to interpret a rate of change of the amount of $NO_x$ downstream of the SCR catalysts, and/or to interpret a rate of change of an amount of $NH_3$ between the SCR catalyst. The procedure further includes an operation to adjust the $NH_3$ reference target in response to one or both of the rates of change. An exemplary procedure further includes an operation to determine a product of the rate of change of the amount of $NO_x$ downstream of the SCR catalysts and the rate of change of the amount of $NH_3$ between the SCR catalysts, and to further adjust the $NH_3$ reference target in response to the product of the rates of change.

In certain embodiments, the procedure further includes an operation to perform the adjusting by reducing the $NH_3$ reference target in response to the product being negative, and an operation to increase the $NH_3$ reference target in response to the product being positive. An exemplary procedure further includes the operation to increase having a higher gain than the operation to reduce. In certain embodiments, the procedure includes an operation to limit the adjusting to a proportion of an amount of $NO_x$ upstream of the SCR catalysts.

An exemplary procedure further includes an operation to interpret an amount of $NH_3$ downstream of the SCR catalysts, an operation to determine an adjusted amount of $NO_x$ downstream of the SCR catalysts in response to the amount of $NH_3$ downstream of the SCR catalysts, and the operation to adjust the $NH_3$ reference target is further in response to the adjusted amount of $NO_x$ downstream of the SCR catalysts. A further exemplary procedure includes an operation to interpret a $NO_x$ reference target including a target amount of $NO_x$ present at a position downstream of the SCR catalysts, an operation to determine an excess downstream $NO_x$ amount in response to the adjusted amount of $NO_x$ downstream of the SCR catalysts and the target amount of $NO_x$, and operation to adjust the $NH_3$ reference target is further in response to the excess downstream $NO_x$ amount. A still further exemplary procedure includes an operation to filter the excess downstream $NO_x$ amount with a filter having a time constant of at least 10 seconds. In certain embodiments, the filter includes a time constant of at least 100 seconds and/or at least 1000 seconds.

As is evident from the figures and text presented above, a variety of embodiments according to the present invention are contemplated.

An exemplary set of embodiments is a method including determining an ammonia ($NH_3$) reference target comprising a target amount of $NH_3$ in an exhaust conduit between a first selective catalytic reduction (SCR) catalyst and a second SCR catalyst, determining a present amount of $NH_3$ in the exhaust conduit between the first SCR catalyst and the second SCR catalyst, and determining an $NH_3$ error term in response to the $NH_3$ reference target and the present amount of $NH_3$. The method further includes determining an amount of $NO_x$ downstream of the second SCR catalyst, and adjusting one of the $NH_3$ reference target and a reductant doser command in response to the amount of $NO_x$ downstream of the second SCR catalyst. The method further includes providing the reductant doser command in response to the $NH_3$ error term.

In certain embodiments, the method further includes determining a rate of change of the present amount of $NH_3$, and further adjusting the one of the $NH_3$ reference target and the reductant doser command in response to the rate of change. In a further embodiment, the method includes determining a rate of change of the amount of $NO_x$ downstream of the second SCR catalyst, and further adjusting the one of the $NH_3$ reference target and the reductant doser command in response to the rate of change of the amount of $NO_x$ downstream of the second SCR catalyst.

An exemplary method includes determining a rate of change of the amount of $NO_x$ downstream of the second SCR catalyst, and further adjusting the one of the $NH_3$ reference target and the reductant doser command in response to the rate of change of the amount of $NO_x$ downstream of the second SCR catalyst. A further exemplary method includes determining a product of the rate of change of the present amount of $NH_3$ and the rate of change of the amount of $NO_x$ downstream of the second SCR catalyst, and further adjusting the one of the $NH_3$ reference target and the reductant doser command in response to the product. A still further exemplary method includes determining a rate-based adjustment amount as a function of the product, and further adjusting the one of the $NH_3$ reference target and the reductant doser command in response to the rate-based adjustment amount. A still further embodiment of the method includes limiting the rate-based adjustment amount to a proportion of an amount of $NO_x$ upstream of the first SCR catalyst. An exemplary method includes limiting the proportion to an amount less than one-half of the amount of $NO_x$ upstream of the first SCR catalyst.

Another exemplary method includes determining an amount of $NH_3$ downstream of the second SCR catalyst, and further adjusting the one of the $NH_3$ reference target and the reductant doser command in response to the amount of $NH_3$ downstream of the second SCR catalyst. A further exemplary method includes determining an adjusted downstream $NO_x$ amount by subtracting the amount of $NH_3$ downstream of the second SCR catalyst from the amount of $NO_x$ downstream of the second SCR catalyst, and further adjusting the one of the $NH_3$ reference target and the reductant doser command in response to the adjusted downstream $NO_x$ amount. A still further exemplary method includes determining an excess downstream $NO_x$ amount in response to the adjusted downstream $NO_x$ amount and a $NO_x$ reference target, and further adjusting the one of the $NH_3$ reference target and the reductant doser command in response to the excess downstream $NO_x$ amount.

Another exemplary set of embodiments is an apparatus including an ammonia ($NH_3$) target module that determines an $NH_3$ reference target, where the $NH_3$ reference target is a target amount of $NH_3$ in an exhaust conduit between a first selective catalytic reduction (SCR) catalyst and a second SCR catalyst. The apparatus includes an $NH_3$ determination module that determines a present amount of $NH_3$ in the exhaust conduit between the first SCR catalyst and the second SCR catalyst, and an $NH_3$ error module that determines an $NH_3$ error term in response to the $NH_3$ reference target and the present amount of $NH_3$. The apparatus further includes a dosing control module that provides a reductant doser command in response to the NH3 error term, and an outer loop control module that determines an amount of $NO_x$ downstream of the second SCR catalyst, and that adjusts one of the $NH_3$ reference target and the reductant doser command in response to the amount of $NO_x$ downstream of the second SCR catalyst.

An exemplary apparatus further includes an $NH_3$ time response adjustment module that determines at least one of a rate of change of the present amount of $NH_3$ and a rate of change of the amount of $NO_x$ downstream of the second SCR catalyst, and that further adjusts the one of the $NH_3$ reference target and the reductant doser command in response to the at least one rate of change.

Another exemplary apparatus includes an $NH_3$ time response adjustment module that determines a product of a rate of change of the present amount of $NH_3$ and a rate of change of the amount of $NO_x$ downstream of the second SCR catalyst, and to further adjust the one of the $NH_3$ reference target and the reductant doser command in response to the product. A further exemplary apparatus includes the $NH_3$ time response adjustment module further determining a rate-based adjustment amount as a function of the product, and further adjusting the one of the $NH_3$ reference target and the reductant doser command in response to the rate-based adjustment amount. In a further embodiment, the $NH_3$ time response adjustment module further limits the rate-based adjustment amount to a proportion of an amount of $NO_x$ upstream of the first SCR catalyst. Additionally or alternatively, the function of the product is a non-linear function having a low gain in a negative region of the product and a high gain in a positive region of the product.

In certain embodiments, the apparatus includes a $NO_x$ trimming module that determines an adjusted downstream $NO_x$ amount in response to the amount of $NO_x$ downstream of the second SCR catalyst and an amount of $NH_3$ downstream of the second SCR catalyst, and further adjusts the one of the $NH_3$ reference target and the reductant doser command in response to the adjusted downstream $NO_x$ amount. In further embodiments, the $NO_x$ trimming module further determines an excess downstream $NO_x$ amount in response to the adjusted downstream $NO_x$ amount and a $NO_x$ reference target, and to further adjust the one of the $NH_3$ reference target and the reductant doser command in response to the excess downstream $NO_x$ amount.

Another exemplary set of embodiments is a system including an internal combustion engine, an exhaust conduit fluidly coupled to the internal combustion engine, a first selective catalytic reduction (SCR) catalyst fluidly coupled to the exhaust conduit, a second SCR catalyst fluidly coupled to the exhaust conduit at a position downstream of the first SCR catalyst, an ammonia sensor operationally coupled to the exhaust conduit at a position between the first SCR catalyst and the second SCR catalyst, and a reductant doser operationally coupled to the exhaust conduit at a position upstream of the first SCR catalyst.

The system further includes a controller having an ammonia ($NH_3$) target module that determines an $NH_3$ reference target. The $NH_3$ reference target is a target amount of $NH_3$ in an exhaust conduit between the first SCR catalyst and the second SCR catalyst. The controller further includes an $NH_3$ determination module that determines a present amount of $NH_3$ in the exhaust conduit between the first SCR catalyst and the second SCR catalyst, an $NH_3$ error module that determines an $NH_3$ error term in response to the $NH_3$ reference target and the present amount of $NH_3$, and a dosing control module that provides a reductant doser command in response to the $NH_3$ error term. The controller further includes an outer loop control module that determines an amount of $NO_x$ downstream of the second SCR catalyst, and adjusts one of the $NH_3$ reference target and the reductant doser command in response to the amount of $NO_x$ downstream of the second SCR catalyst. In certain embodiments, the outer loop control module further adjusts the one of the ammonia reference target and the reductant doser command only when the amount of $NO_x$ downstream of the second SCR catalyst exceeds a threshold.

Another exemplary set of embodiments is a method including interpreting an $NH_3$ reference target comprising a target amount of $NH_3$ present at a mid-bed position between two selective catalytic reduction (SCR) catalysts, interpreting an amount of $NO_x$ downstream of the SCR catalysts, adjusting the $NH_3$ reference target in response to the amount of $NO_x$ downstream, and injecting an amount of urea upstream of the SCR catalysts in response to the adjusted $NH_3$ reference target. In certain further embodiments, the method includes interpreting a rate of change of the amount of $NO_x$ downstream of the SCR catalysts, and/or interpreting a rate of change of an amount of $NH_3$ between the SCR catalyst, and where the adjusting inlcudes adjusting the $NH_3$ reference target in response to one or both of the rates of change. An exemplary method further includes determining a product of the rate of change of the amount of $NO_x$ downstream of the SCR catalysts and the rate of change of the amount of $NH_3$ between the SCR catalysts, and where the adjusting includes adjusting the $NH_3$ reference target in response to the product of the rates of change.

In certain embodiments, the method further includes performing the adjusting by reducing the $NH_3$ reference target in response to the product being negative, and increasing the $NH_3$ reference target in response to the product being positive. An exemplary method includes the increasing having a higher gain than the reducing. In certain embodiments, the method includes limiting the adjusting to a proportion of an amount of $NO_x$ upstream of the SCR catalysts.

An exemplary method further includes interpreting an amount of $NH_3$ downstream of the SCR catalysts, determining an adjusted amount of $NO_x$ downstream of the SCR catalysts in response to the amount of $NH_3$ downstream of the SCR catalysts, and where the adjusting is further in response to the adjusted amount of $NO_x$ downstream of the SCR catalysts. A further exemplary method includes interpreting a $NO_x$ reference target including a target amount of $NO_x$ present at a position downstream of the SCR catalysts, determining an excess downstream $NO_x$ amount in response to the adjusted amount of $NO_x$ downstream of the SCR catalysts and the target amount of $NO_x$, and where the adjusting is further in response to the excess downstream $NO_x$ amount. A still further exemplary method includes filtering the excess downstream $NO_x$ amount with a filter having a time constant of at least 10 seconds. In certain embodiments, the filter includes a time constant of at least 100 seconds and/or at least 1000 seconds.

While the invention has been illustrated and described in detail in the drawings and foregoing description, the same is to be considered as illustrative and not restrictive in character, it being understood that only certain exemplary embodiments have been shown and described and that all changes and modifications that come within the spirit of the inventions are desired to be protected. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A method, comprising:
   determining an ammonia ($NH_3$) reference target comprising a target amount of $NH_3$ in an exhaust conduit between a first selective catalytic reduction (SCR) catalyst and a second SCR catalyst located in the exhaust conduit;
   determining a present amount of $NH_3$ in the exhaust conduit between the first SCR catalyst and the second SCR catalyst with an ammonia sensor;
   determining an $NH_3$ error term in response to the $NH_3$ reference target and the present amount of $NH_3$;
   determining a reductant doser command in response to the $NH_3$ error term;
   determining an amount of $NO_x$ downstream of the second SCR catalyst, and adjusting one of the $NH_3$ reference target and a reductant doser command in response to the amount of $NO_x$ downstream of the second SCR catalyst; and
   injecting, with a reductant injector, an amount of reductant in response to the adjusted one of the $NH_3$ reference target and the reductant doser command.

2. The method of claim 1, further comprising determining a rate of change of the amount of $NO_x$ downstream of the second SCR catalyst, and further adjusting the one of the $NH_3$ reference target and the reductant doser command in response to the rate of change of the amount of $NO_x$ downstream of the second SCR catalyst.

3. The method of claim 1, further determining an amount of $NH_3$ downstream of the second SCR catalyst, and further adjusting the one of the $NH_3$ reference target and the reductant doser command in response to the amount of $NH_3$ downstream of the second SCR catalyst.

4. The method of claim 3, further comprising determining an adjusted downstream $NO_x$ amount by subtracting the amount of $NH_3$ downstream of the second SCR catalyst from the amount of $NO_x$ downstream of the second SCR catalyst, and further adjusting the one of the $NH_3$ reference target and the reductant doser command in response to the adjusted downstream $NO_x$ amount.

5. The method of claim 4, further comprising determining an excess downstream $NO_x$ amount in response to the adjusted downstream $NO_x$ amount and a $NO_x$ reference target, and further adjusting the one of the $NH_3$ reference target and the reductant doser command in response to the excess downstream NO$_x$ amount.

6. An apparatus, comprising:
an electronic controller operably connected to a reductant doser, the electronic controller including a plurality of modules that are implemented as at least one of hardware and instructions on a computer readable medium, the plurality of modules including:
an ammonia (NH$_3$) target module structured to determine an NH$_3$ reference target comprising a target amount of NH$_3$ in an exhaust conduit between a first selective catalytic reduction (SCR) catalyst and a second SCR catalyst, wherein the NH$_3$ reference target is the target amount of NH$_3$ that occurs at a mid-bed position between the first SCR catalyst and the second SCR catalyst in response to injection of a targeted amount of reductant upstream of the first SCR catalyst;
an NH$_3$ determination module structured to determine a present amount of NH$_3$ in the exhaust conduit between the first SCR catalyst and the second SCR catalyst in response to an output from an ammonia sensor that defines a separation point between the first SCR catalyst and the second SCR catalyst at the mid-bed position;
NH$_3$an error module structured to determine an NH$_3$ error term in response to the NH$_3$ reference target and the present amount of NH$_3$;
a dosing control module structured to provide a reductant doser command in response to the NH$_3$ error term; and
an outer loop control module structured to determine an amount of NO$_x$ downstream of the second SCR catalyst, and to adjust one of the NH$_3$ reference target and the reductant doser command in response to the amount of NO$_x$ downstream of the second SCR catalyst and control the reductant doser to inject reductant in response to the adjusted one of the NH$_3$ reference target and the reductant doser command.

7. The apparatus of claim 6, further comprising an NH$_3$ time response adjustment module structured to determine at least one of a rate of change of the present amount of NH$_3$ and a rate of change of the amount of NO$_x$ downstream of the second SCR catalyst, and to further adjust the one of the NH$_3$ reference target and the reductant doser command in response to the at least one rate of change.

8. The apparatus of claim 6, further comprising an NH$_3$ time response adjustment module structured to determine a product of a rate of change of the present amount of NH$_3$ and a rate of change of the amount of NO$_x$ downstream of the second SCR catalyst, and to further adjust the one of the NH$_3$ reference target and the reductant doser command in response to the product.

9. the apparatus of claim 8, wherein the NH$_3$ time response adjustment module is further structured to determine a rate-based adjustment amount as a function of the product, and to further adjust the one of the NH$_3$ reference target and the reductant doser command in response to the rate-based adjustment amount.

10. The apparatus of claim 9, wherein the NH$_3$ time response adjustment module is further structured to limit the rate-based adjustment amount to a proportion of an amount of NO$_x$ upstream of the first SCR catalyst.

11. The apparatus of claim 9, wherein the function of the product comprises a non-linear function having a low gain in a negative region of the product and a high gain in a positive region of the product.

12. The apparatus of claim 6, further comprising a NO$_x$ trimming module structured to determine an adjusted downstream NO$_x$ amount in response to the amount of NO$_x$ downstream of the second SCR catalyst and an amount of NH$_3$ downstream of the second SCR catalyst, and to further adjust the one of the NH$_3$ reference target and the reductant doser command in response to the adjusted downstream NO$_x$ amount.

13. The apparatus of claim 12, wherein the NO$_x$ trimming module is further structured to determine an excess downstream NO$_x$ amount in response to the adjusted downstream NO$_x$ amount and a NO$_x$ reference target, and to further adjust the one of the NH$_3$ reference target and the reductant doser command in response to the excess downstream NO$_x$ amount.

14. A method, comprising:
interpreting an NH$_3$ reference target comprising a target amount of NH$_3$ present at a mid-bed position between two selective catalytic reduction (SCR) catalysts, wherein the NH3 reference target is the target amount of NH$_3$ that occurs at a mid-bed position between the SCR catalysts in response to injection of a targeted amount of reductant upstream of the SCR catalysts;
interpreting an amount of NO$_x$ downstream of the SCR catalysts and a present amount of NH$_3$ in the exhaust conduit between the SCR catalysts in response to an output from ammonia sensor that defines a separation point between the SCR catalysts at the mid-bed position;
adjusting the NH$_3$ reference target in response to the amount of NO$_x$ downstream of the SCR catalysts, the present amount of NH$_3$, and the NH$_3$ reference target; and
injecting, with a reductant injector, an amount of urea upstream of the SCR catalysts in response to the adjusted NH$_3$ reference target.

15. The method of claim 14, further comprising interpreting an amount of NH$_3$ downstream of the SCR catalysts, determining an adjusted amount of NO$_x$ downstream of the SCR catalysts in response to the amount of NH$_3$ downstream of the SCR catalysts, and wherein the adjusting is further in response to the adjusted amount of NO$_x$ downstream of the SCR catalysts.

16. The method of claim 15, further comprising interpreting a NO$_x$ reference target comprising a target amount of NO$_x$ present at a position downstream of the SCR catalysts, determining an excess downstream NO$_x$ amount in response to the adjusted amount of NO$_x$ downstream of the SCR catalysts and the target amount of NO$_x$ and wherein the adjusting is further in response to the excess downstream NO$_x$ amount.

17. The method of claim 16, further comprising filtering the excess downstream NO$_x$ amount with a filter having a time constant of at least 10 seconds.

18. The method of claim 16, further comprising filtering the excess downstream NO$_x$ amount with a filter having a time constant of at least 100 seconds.

19. The method of claim 16, further comprising filtering the excess downstream NO$_x$ amount with a filter having a time constant of at least 1000 seconds.

* * * * *